United States Patent [19]
Baker

[11] 3,710,231
[45] Jan. 9, 1973

[54] D.C. STATIC SWITCH INCLUDING MEANS TO SUPPRESS TRANSIENT SPIKES BETWEEN A DRIVE SOURCE AND THE SWITCH ELEMENT

[75] Inventor: Donal E. Baker, Lima, Ohio

[73] Assignee: Westinghouse Electric Corporation, Pittsburgh, Pa.

[22] Filed: March 15, 1971

[21] Appl. No.: 124,310

[52] U.S. Cl. .......................... 323/9, 321/2, 323/22 T
[51] Int. Cl. ................................................ G05f 1/58
[58] Field of Search ............ 317/20, 33 R; 321/2, 25; 323/9, 22 T, 38, DIG. 1

[56] References Cited

UNITED STATES PATENTS

| | | |
|---|---|---|
| 3,609,512 | 9/1971 | Lewis ...................................... 323/9 |
| 3,377,546 | 4/1968 | Schott ................................. 323/22 T |
| 3,513,378 | 5/1970 | Kemper ..................................... 323/9 |
| 3,373,334 | 3/1968 | Geisz et al. ............................... 321/2 |
| 3,290,583 | 12/1966 | Sinclair ..................................... 323/9 |

*Primary Examiner*—A. D. Pellinen
*Attorney*—A. T. Stratton, F. P. Lyle and Gordon H. Telfer

[57] ABSTRACT

A low voltage drop, D.C. static switch with improved controllability for current limiting is provided wherein the transient spikes from a drive source such as a free running, core-timed oscillator are suppressed by one or more static amplifier stages before the drive signal is supplied to the power switch element. A current limit controller can be isolated from the transient spike source. Such switches have good characteristics for remote power controllers.

6 Claims, 4 Drawing Figures

PATENTED JAN 9 1973

WITNESSES
Bernard R. Giegway
Leon M. Garman

INVENTOR
Donal E. Baker

BY Gordon W. Telder
ATTORNEY

D.C. STATIC SWITCH INCLUDING MEANS TO SUPPRESS TRANSIENT SPIKES BETWEEN A DRIVE SOURCE AND THE SWITCH ELEMENT

BACKGROUND OF THE INVENTION
characteristics

1. Field of the Invention

The invention relates to D.C. static switching circuits for use in electrical power systems.

2. State of the Art

The advantages of static (e.g. semiconductor) switching devices as compared with electromechanical switching devices have been previously recognized. One application in which static switches are of immediate interest is in aircraft or spacecraft power systems. Performance qualities including fast trip-out time during large faults, ability to limit inrush currents, ability to switch loads remotely, and generally protect loads and conductors are highly advantageous and important in that type of power system. These qualities are inherently easier to obtain with static devices than with conventional mechanical thermal circuit breakers.

Some power systems, particularly aircraft power systems, require D.C. power controllers, one for each of the many loads that may be in the system, that are capable of limiting the maximum current flow when any fault is present. A definite limit on fault current means the system can be built with the smallest size electrically conducting wire that will safely carry the maximum normal current. Because of the miles of wire that may be necessary, the effect of wire size on total system weight and cost is great. Current limiting is also an important factor to reduce system transients. It is clear that static switches can provide the desired current limiting functions yet there have previously been problems in doing so without adversely affecting other aspects of performance. Besides having a definite limit on current magnitude, it is necessary that the D.C. power controller provide ripple-free, low noise, controllable current to the load during overload or faulted conditions. Previously available techniques for the use of static switches in D.C. power controllers do not readily meet these requirements without sacrificing speed or substantially increasing cost and complexity.

FIG. 1 is a schematic diagram of a circuit that has been previously proposed. Here the transistor 10, an NPN power transistor, has its collector connected to the positive side of a direct voltage source and its emitter connected to the load to be controlled, the other side of the load being grounded. Transistor 10 can perform "Class A" amplifier operation up to saturation. The performance of these functions is determined by the drive current and voltage that is supplied to the base of transistor 10. In the circuit of FIG. 1, a free running, core-timed oscillator, enclosed by dashed line 16, is used that includes a saturable core transformer 12 with a "primary" center tapped winding 13 and two separate "secondary" center tapped windings 14 and 15.

A constant current regulator 18, which is some means for supplying constant current to the center tap of winding 13, is connected between the direct voltage source and the center tap of winding 13. To form the free running, core-timed oscillator, one outer tap of winding 13 is connected to ground through the collector-emitter path of transistor 20 and also through resistor 21 and the base-emitter of transistor 22. The other outer tap of winding 13 is connected to ground through the collector-emitter path of transistor 22 and also through resistor 23 and the base-emitter of transistor 20.

The secondary winding 14 is connected to provide base drive for the transistor 10. The outer taps of winding 14 are each connected to the base of transistor 10 through one of a pair of like-poled diodes 24 and 25 which have their cathodes connected to the base. The center tap of winding 14 is connected to the emitter of transistor 10.

A current limiting controller 26 is connected across secondary winding 15. The separate winding 15 is used to divert part of the base drive current away from winding 14 and the base of transistor 10 as load current, e.g. sensed by resistive shunt 27, builds up. In this manner, the transistor 10 can be driven to a point less than saturation, permitting it to operate as a "Class A" amplifier, sometimes referred to herein as the "current limiting mode of operation" in contrast with saturation which is a "full on" condition.

Circuits of the type illustrated in FIG. 1 give acceptable efficiency and voltage drop for the mode in which transistor 10 is fully on. However, when the current limit controller 26 causes a reduction in base drive current, the output is not acceptable because of excessive ripple and noise in the current delivered to the load. This results primarily from the fact that practically realizable transformers have some noticeable leakage inductance causing voltage spikes and current spikes which could be avoided only by substantially affecting the speed of operation.

FIG. 2 is a set of waveforms for various voltages and currents in the circuit of FIG. 1 to illustrate the referred to spikes during class A operation of transistor 10. $V_P$ is the voltage across half the primary winding 13. $V_S$ is the voltage across half the secondary winding 14. $V_B$ is the voltage between the base and emitter of transistor 10. $I_B$ is the base drive current for transistor 10. $I_C$ is the collector current of transistor 10 and is the output current supplied by the power controller to the load. It can be seen that in relative magnitude the spikes in $I_C$ are large and this is most undesirable.

It is apparent that modification of the FIG. 1 circuit merely to control the constant current regulator 18 directly rather than through winding 13 has the same drawbacks. In either case the mode of control of the drive current to transistor 10 is the same, through transformer 12, and permits no means of controlling or limiting voltage and current spikes on the secondary side of the transformer.

Another type of D.C. static switch is that disclosed by the present inventor in copending application Ser. No. 92,348, filed Nov. 24, 1970, now U.S. Pat. No. 3,671,844 issued June 20, 1972 and assigned to the present assignee. The apparatus of the copending application is intended for full on or full off operation only. If operated in a current limiting mode it would have drawbacks similar to those of the circuit of FIG. 1.

SUMMARY

The present invention provides improvement over the prior art exemplified by the circuit of FIG. 1 by developing the current limiting control signals from a current limit controller to a power switch drive circuit directly rather than through a saturable core transformer. Such a transformer is, however, retained in preferred circuits in accordance with this invention for driving the main switching transistor. The voltage and current spiking condition still occurs because of the nature of the transformer but now these spikes are not coupled into the power transistor. The result is an improved power controlling device capable of providing nearly ripple and noise free D.C. current.

DRAWING

PREFERRED EMBODIMENTS

Figure 3:
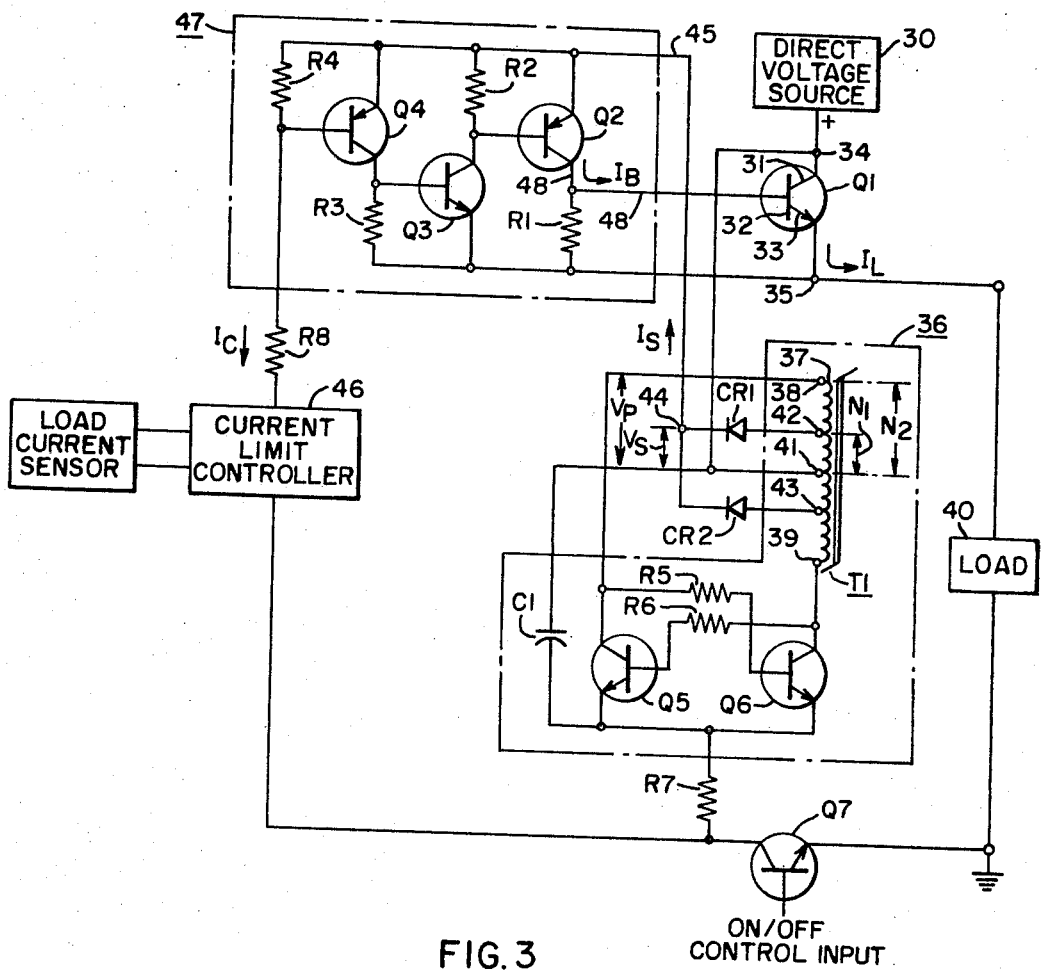
FIG. 3 is a circuit schematic of an exemplary embodiment of the present invention.

Referring to FIG. 3, a D.C. static switch circuit or power controller in accordance with this invention is shown. A three electrode static switching and amplifying device, transistor Q1, is the main power switching transistor for controlling application of power from a direct voltage source 30 to a load 40. In this example, Q1 is an NPN transistor with the collector, base and emitter identified as elements 31, 32 and 33, respectively. Q1 has its collector 31 connected to circuit point 34 (sometimes referred to as the supply circuit point) on the positive side of direct voltage source 30. The emitter 33 of Q1 is connected to a line or point 35 (sometimes referred to as the load circuit line or point) on the ungrounded side of the load 40.

A free running core-timed oscillator 36 provides base drive for Q1. Oscillator 36 includes saturable core transformer T1 with a single, multi-tap, winding 37 whose outermost taps 38 and 39 are connected with resistors R5 and R6 and transistors Q5 and Q6 in the known manner for a free running core-timed oscillator, as described in connection with FIG. 1. The center tap 41 of winding 37 is connected to circuit point 34 and also is coupled through capacitor C1 to the emitters of Q5 and Q6. Intermediate taps 42 and 43 of winding 37, located symmetrically about center tap 41, are connected respectively to the anodes of diodes CR1 and CR2 whose cathodes are connected to circuit point 44 and to common line 45.

Additional static switching and amplifying devices include PNP transistor Q2 which has its emitter connected to line 45 and its collector connected to the base 32 of Q1 as well as to line 35 through resistor R1. NPN transistor Q3 has its collector connected to line 45 through resistor R2 with a direct connection from the collector of Q3 to the base of Q2. The emitter of Q3 is connected to line 35. PNP transistor Q4 has its emitter connected to line 45 and its collector connected to the base of Q3 and also through resistor R3 to line 35. The base of Q4 is connected through resistor R4 to line 45 and also through resistor R8 to a current limit controller 46 to be described. The devices Q2, Q3 and Q4 are connected in cascaded amplification stages 47 whose composite output, on line 48, is to the base 32 of Q1. The amplifier 47 is controlled by current limit controller means 46. A resistor R7 is connected to the emitters of transistors Q5 and Q6 and to the collector of an input control transistor Q7 whose emitter is grounded.

In operation, the free running core-timed oscillator 36 supplies current through CR1 and CR2 to amplifier circuit 47 rather than directly to the base 32 of Q1. The ratio of turns $N_2$ to $N_1$ of winding 37, where $N_2$ is the number of turns between taps 38 and 41 and $N_1$ is the number of turns between taps 41 and 42 and the value of R7 are selected to provide a desired current level on line 45 as will be described.

The switch under a given set of requirements must be capable of passing up to 1.5 (although it could be some other artibrary value) times normal current before current limiting occurs. When these conditions are met, and transistor Q4 is biased on, the entire power switch consisting of Q1, Q2, Q3 and Q4 will be on. The forward voltage drop across Q1 will be equal to or less than that attained with the prior art circuit of FIG. 1 for all normal load conditions. As load current increases from zero, increased base drive to Q1 is necessary.

Under overload conditions, base current in excess of the oscillator's capacity is provided from the supply 30. The switch has a higher voltage drop for overload conditions, as is also the case with the prior art circuit, and this is acceptable. With circuits of the prior art, overloads require higher base drive current to the transistor corresponding to Q1 that adversely affects efficiency.

During the current limiting mode of operation, the saturation level of Q1 is controlled directly by varying control current $I_C$. The magnitude of $I_C$ can be made as small as desired by adding amplification stages between lines 35 and 45. In the illustrated example, a total of three such stages, Q1, Q2, and Q3 are used. If 10 amperes of load current are to be controlled, the magnitude of $I_C$ should be 1 milliampere or less. In this range, it is feasible to use linear integrated circuits for the current limiting controller which was not permissible with the prior art circuit.

Also, during the current limiting mode of operation, the oscillator output current is not directly connected to power transistor Q1. When Q1 is not in full saturation, and is in the current limiting mode, Q2 is also not in saturation. When Q2 is in the linear portion of its operating characteristic, it appears essentially as a current source to its load, Q1. Consequently, positive voltage spikes from the output of T1 do not cause current spikes into the base of Q1.

In the example of FIG. 3, an autotransformer configuration is used for T1, that is with a single, multitapped winding 37. However, an isolated secondary winding (to which taps 41, 42 and 43 would be connected) can be used instead if desired to permit a greater choice in the manner in which the load current is sensed for the current limit controller. In the preferred case, sensing is done by a resistive shunt in the supply side of the switch which should use an isolated winding. See copending application Ser. No. 124,232, filed Mar. 15, 1971 by the present inventor and assigned to the present assignee.

Current limit controller 46 can take various forms in the practice of this invention. Its purpose is to control the magnitude of current $I_C$ which has an inverse effect on the magnitude of load current $I_L$. Controller 46 could be a manually controlled resistor or a transistor connected to vary $I_C$ as needed. Preferably controller 46 controls the voltage across R8 and, hence, the current $I_C$ by a load current detector. The detector may be an operational amplifier with a resistive shunt at some point on the load circuit between points 34 and 35 sensing $I_L$. The operational amplifier is preferably in a configuration to reduce $I_C$ if $I_L$ is to exceed a predetermined level in a manner not dependent on load impedance. Further description of a preferred current limit controller 46, useful in the circuit of FIG. 3 as further described in the following detailed example, may be found by referring to above mentioned copending application Ser. No. 124,232.

Figure 2:
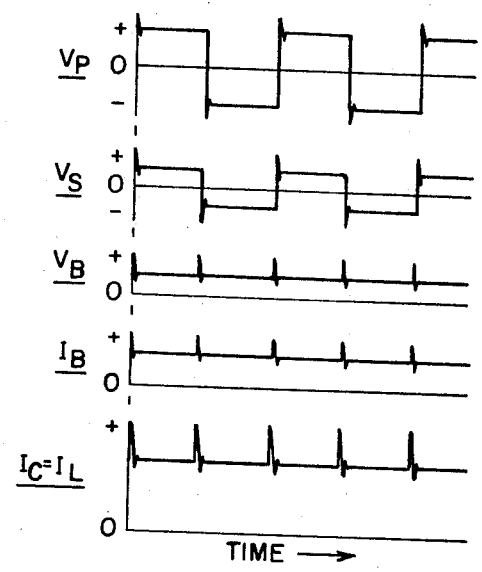
FIG. 2 is a set of waveforms of voltages and currents occurring during operation of the circuit of FIG. 1.
Figure 4:
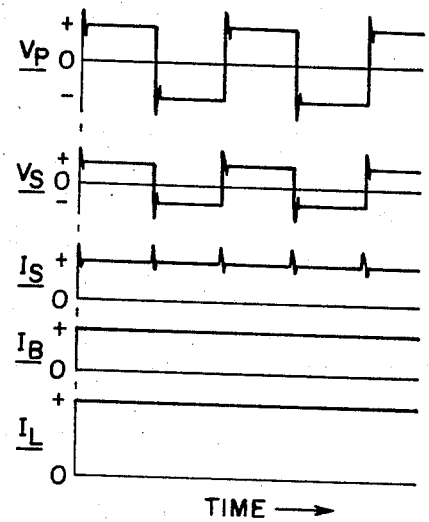
FIG. 4 is a set of waveforms of voltages and currents occurring during operation of the circuit of FIG. 3.

FIG. 4 shows the waveforms for various voltages and currents of the circuit of FIG. 3 during the current limiting mode of operation. The similarities and differences with the corresponding functions of the prior art circuit (as shown in FIG. 2) can be readily noted; $I_L$ does not have transient spikes.

A circuit as illustrated in FIG. 3 has been constructed and successfully operated. By way of further example, the following components are suitable.

| | |
|---|---|
| Transistor Q1 | Westinghouse Type 125, 2N2117 |
| Transistor Q2 | 2N3790 |
| Transistor Q3 | 2N3441 |
| Transistor Q4 | 2N4829 |
| Transistor Q5 | 2N2243 |
| Transistor Q6 | 2N2243 |
| Transformer T1 | 11:1 turns ration, core Magnetics Inc. 50056–1D |
| Diode CR1 | 1N4942 |
| Diode CR2 | 1N4942 |
| Resistor R1 | 47 ohms |
| Resistor R2 | 56 ohms |
| Capacitor C1 | 5.6 microfarads |
| Resistor R3 | 1,000 ohms |
| Resistor R4 | 2,000 ohms |
| Resistor R5 | 5,100 ohms |
| Resistor R6 | 5,100 ohms |
| Resistor R7 | 80 ohms |
| Resistor R8 | 10,000 ohms |
| Load 40 | 2.8 ohms nominal |
| Direct Voltage Source | 30 VDC nominal |

Typical operating characteristics of a circuit as described are:
Voltage drop: 0.32 Volts
Electrical Efficiency: 97 to 98 percent at full load.
Speed: less than 20 microseconds response time.
Current limiting capability: 15 amperes.
Control power level: 90 milliwatts (current limit controller)
Ripple Content: less than one percent
Noise Content: less than one percent
High fault current at normal efficiency limited by Q1, could be as high as 30 amperes for Q specified.

These operating characteristics are found to compare favorably with the corresponding characteristics of prior art circuits.

Figure 1:
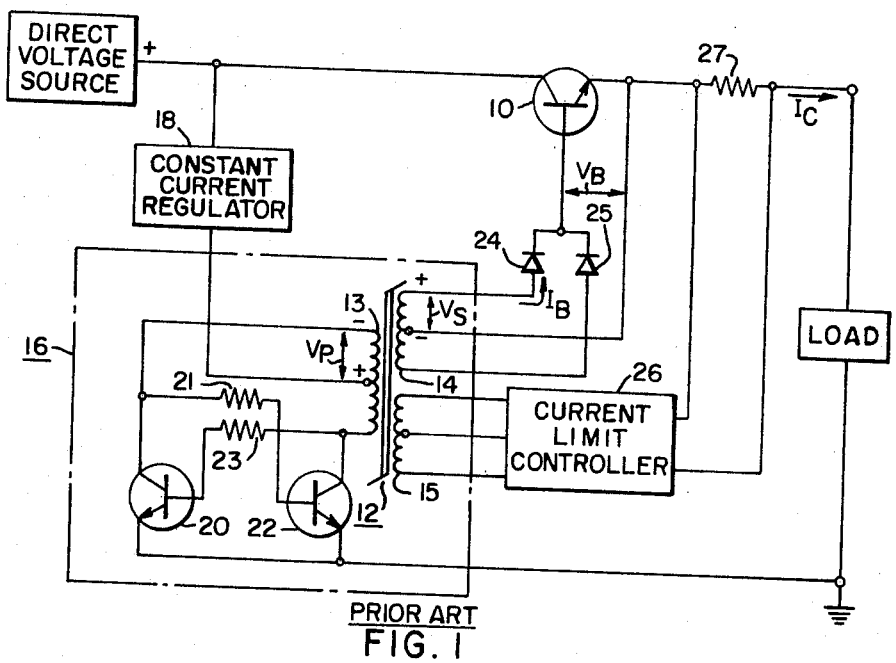
FIG. 1 is a circuit schematic of a prior art circuit relevant to this invention which has been discussed previously herein.

In the circuit of FIG. 3, sufficient current regulation is provided by resistor R7. A constant current regulator 18, as indicated in FIG. 1, which normally requires an additional active element (e.g. transistor), is unnecessary.

I claim:

1. Apparatus to control the application of D.C. power from a supply circuit point to a load circuit point, comprising:
   a first static switching and amplifying device having first, second and third electrodes of which said first electrode is connected to the supply circuit point and said third electrode is connected to the load circuit point, said second electrode being a control electrode, a transformer having a saturable core and at least one winding thereon having a plurality of turns, a first number of turns disposed symmetrically about a center tap on said at least one winding connected at symmetrical taps respectively through like poled diode rectifiers to a common line, said center tap being connected to said supply circuit point; at least one additional static switching and amplifying device in at least one amplification stage having an input from said common line, an output to said second electrode of said first static switching and amplifying device, said second electrode being isolated from said common line by said at least one amplification stage, and said at least one amplification stage also having a control point connected to current limit control means for permitting variable control of the amount of signal applied to said second electrode of said first static switching and amplifying device without any appreciable spikes in the current applied to said load circuit point.

2. The subject matter of claim 1 wherein:
   said static switching and amplifying devices are transistors, said second electrode of said first device being the base electrode thereof; and further comprising a free running, core-timed oscillator including said transformer for developing signals to said turns connected to said like poled diode rectifiers.

3. The subject matter of claim 2 wherein said current limit control means is electrically isolated from said at least one winding of said transformer and is not influenced by transient spikes developed in said transformer.

4. In an electrical power system, the combination comprising:
   a power transistor with a collector-emitter path connected between a source of direct voltage and a load, a transistor amplifier circuit connected to the base of said power transistor; means including a free running, core-timed oscillator for developing signals applied to the input of said transistor amplifier circuit; current limit control means also connected to the input of said amplifier to permit modification of current supplied to the base of said power transistor; said free running, core-timed oscillator including a transformer exhibiting characteristic leakage inductance evidenced as voltage spikes on its windings upon going in and out of saturation; said current limit control means and the base of said power transistor being effectively isolated from said voltage spikes by said amplifier circuit.

5. Apparatus to control the application of D.C. power from a supply circuit point to a load circuit point, comprising:

static switching means having first and second electrodes between supply and load circuit points and a control electrode; means to develop a D.C. drive signal characterized by appreciable transient current spikes; and means to suppress said transient current spikes connected intermediate said D.C. drive signal means and said control electrode, said means to suppress said transient current spikes comprising at least one static amplifier stage and current limit control means to control the magnitude of drive current to said at least one static amplifier stage in accordance with variations in magnitude of current between said supply and load circuit points.

6. The subject matter of claim 5 wherein:

said means to develop a D.C. drive signal characterized by appreciable transient current spikes comprises a free-running core time oscillator; and said static switching means and said at least one static amplifier each comprise a transistor.

* * * * *